Patented Aug. 18, 1953

2,649,389

UNITED STATES PATENT OFFICE 2,649,389

ANTIVESICANT COMPOUNDS AND CLOTHING IMPREGNATED THEREWITH

Jonathan W. Williams, Hyattsville, Md

No Drawing. Application January 16, 1943,
Serial No. 472,651

9 Claims. (Cl. 117—121)

(Granted under Title 35, U. S. Code (1952), sec. 266)

This invention relates to a new class of antivesicants and improved methods of making them. It is particularly concerned with the preparation of certain new compounds of unusual stability and neutralizing power for such vesicants as mustard gas and the organic chlorarsines.

Where areas have been contaminated by vesicants, such as mustard gas or organic chlorarsines, it is necessary to neutralize the vesicant before the area can be safely entered. Also it is necessary to provide workers in contaminated areas with suitable protective clothing. Clothing which seals the body from contact with the air cannot be worn for long periods in hot weather, because the only way the body temperature may be maintained is by evaporation of perspiration. Therefore, it is necessary to provide porous clothing which is impregnated with a substance which will neutralize substantially all vesicant vapor coming in contact with the clothing. In this way air is permitted to circulate around the body without harm.

Substances which are useful for decontamination of affected areas must of course show instantaneous reactivity with the vesicant vapors. If they are to be used for impregnation of clothing they must additionally be harmless to the skin and stable to oxygen, water and sunlight. They must also cause little or no increase in flammability or deterioration of the cloth, they must withstand removal or decomposition by laundering and they must be thermally stable at all temperatures likely to be encountered in use. Other desirable properties include stability in solution or in the presence of a solvent so that appreciable decomposition does not occur during impregnation, easy preparation from readily available raw materials with simple apparatus, and high efficiency and protective time so that great quantities of the substance and frequent replenishment are not required.

It is well known that compounds containing reactive chlorine are useful neutralizers or antivesicants for mustard gas and other vesicant vapors, and organic compounds containing a chloroamide group are generally preferred. One of the most efficient of these compounds is 5,5 dimethyl 1,3 dichloro hydantoin which has been used extensively. However, none of the known anti-vesicants has all of the above desirable properties and more efficient anti-vesicants are needed.

This invention provides a new class of antivesicants which are characterized by their greater efficiency and protective time over the anti-vesicants heretofore employed, and they also have the above described desirable properties to a greater extent than other known materials. The invention also provides novel methods for making this class of anti-vesicants, and certain new chemical compounds. Also included are protective materials containing these anti-vesicants, such as impregnated clothing, dusting powders and the like.

The anti-vesicants of this invention are of the class of chloroamides which may be described as tetrachloro disubstituted glycolurils, having the following structural formula:

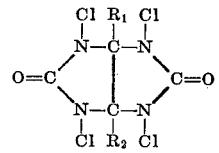

wherein $R_1$ and $R_2$ are substituted or unsubstituted alkyl or aryl groups which are not highly reactive, the one exception being when $R_1$ and $R_2$ contain chloramide groups.

The preferred compounds are those in which $R_1$ and $R_2$ represent alkyl groups, with the aryl substituted glycolurils next.

These glycolurils are generally of greater thermal stability than other known chloramides and they contain a higher percentage of active chlorine, so that they are more efficient neutralizers and more lasting.

The following examples show the preparation of typical compounds of this class.

EXAMPLE I

*1,3,4,6 tetrachloro-7,8-diphenyl glycoluril*

In a 5-liter, three-necked flask equipped with a reflux condenser and stirrer were placed 210 grams (1.0 mole) of benzil, 60 grams (1.0 mole) of urea, 2 liters of 95% ethanol and 50 cc. of concentrated hydrochloric acid (sp. gr. 1.18). The mixture was heated at reflux for 9 hours. Every three hours 60 grams of urea were added until the reaction mixture had received a total of 240 grams of urea. At the last addition 500 cc. of 95% ethanol and 50 cc. of concentrated hydrochloric acid were also added.

The reaction mixture was then heated at reflux for an additional period of 8 hours. It was cooled and the precipitated product removed by filtration, washed with 500 cc. of ethanol and dried. The product was then slurried with 1.5 liters of boiling water, filtered, washed with 500 cc. of ethanol and dried. The product, 7,8 diphenyl glycoluril, was pure white in color.

In a twelve liter flask equipped with a stirrer, gas feed and thermometer were placed 294 grams (1.0 mole) of the 7,8 diphenyl glycoluril prepared above, 364.5 grams (4.5 moles) of sodium acetate, 5 liters of water and 10 cc. of a 10% solution of the di-n-octyl ester of sodium sulfosuccinic acid. The latter was added as a wetting agent to obtain fine dispersion of the gas in the slurry. The slurry was then heated to 55° C. and chlorine introduced. Three hundred grams (4.23 moles) of chlorine were passed into the slurry over a period of 12 hours, during which time the temperature was maintained at 50° to 60° C. The product, 1,3,4,6 tetrachloro-7,8 diphenyl glycoluril, was removed by filtration, washed with water and dried at 100° C. A portion recrystallized from a mixture of petroleum ether and chloroform had a melting point of about 247° to 247.5° C., and analysis showed 32.8% chlorine attached to nitrogen.

EXAMPLE 2

*1,3,4,6 tetrachloro-7-methyl-8-phenyl glycoluril*

The 7-methyl-8-phenyl glycoluril was prepared by adding 14.8 grams (0.1 mole) of acetylbenzoyl, 24.0 grams (0.4 mole) of urea and 2 cc. of concentrated hydrochloric acid to a mixture of 50 cc. of water and 80 cc. of 94% ethanol. The reaction mixture was allowed to stand in a stoppered flask at room temperature for 22 hours. At the end of this time the precipitated product was filtered and washed by slurrying in hot ethanol.

Three grams of the 7-methyl-8-phenyl glycoluril were suspended in 50 cc. of glacial acetic acid and 10 grams of calcium hypochlorite were slowly added with stirring. The temperature rose to 55° C. during the addition. The mixture was allowed to stand for 30 minutes and then stirred into 200 cc. of cold water. The precipitated product was removed by filtration, washed with water and dried. A small quantity of the substance, which was recrystallized twice from a mixture of chloroform and petroleum ether, showed 37.3% by weight chlorine attached to nitrogen, as compared to the theoretical amount of 38.4%.

EXAMPLE 3

*1,3,4,6 tetrachloro-7,8-dimethyl glycoluril*

The 7,8 dimethyl glycoluril was prepared by placing 602 grams (7.0 moles) of diacetyl in 4 liters of water and adding 1,120 grams (18.9 moles) of urea. To this mixture was added 100 cc. of concentrated hydrochloric acid. The product began to precipitate soon after the addition of the acid. After standing at room temperature for 16 hours, the product was removed by filtration and washed until the filtrate was colorless. The washing was then repeated with 95% ethanol. After drying, the product was a light tan color.

The dimethyl glycoluril was chlorinated in the same way as the diphenyl compound described in Example 1. Twelve to fourteen hours were required for chlorination to 93% of the theoretical amount. The pure white product was removed by filtration, washed with water and dried. Analysis showed the material to contain 44.5% chlorine attached to nitrogen, as compared to the theoretical amount of 46.1%. A small portion of the compound was recrystallized twice from tetrachloroethane by dissolving it at 75° C., filtering hot in order to remove unchlorinated base, and cooling. The chloramide had a melting point of 218° to 219° C., at which, however, decomposition set in.

The compounds prepared according to the above examples may be designated by their structural formulas, as follows:

EXAMPLE 1

*1,3,4,6 tetrachloro-7,8-diphenyl glycoluril*

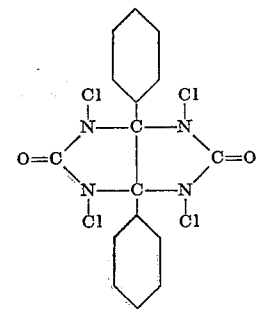

EXAMPLE 2

*7-methyl-8-phenyl glycoluril*

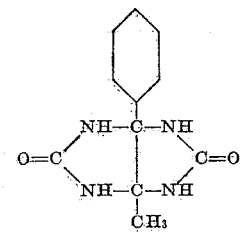

*1,3,4,6 tetrachloro-7-methyl-8-phenyl glycoluril*

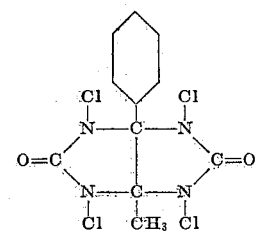

EXAMPLE 3

*7,8 dimethyl glycoluril*

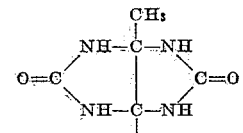

*1,3,4,6 tetrachloro-7,8-dimethyl glycoluril*

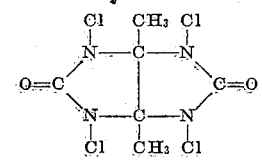

Obviously the glycoluril bases may be designated generically by the type formula

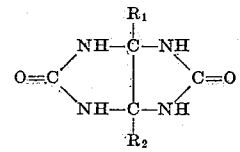

wherein $R_1$ and $R_2$ are substituted or unsubstituted alkyl or aryl groups or groups including chloroamide radicals.

The above compounds were subject to the following stability tests:

1. Thermal stability in the dry state at 100° C.
2. Thermal stability in the dry state at 150° C.
3. Hydrolytic stability in the presence of boiling water.
4. Stability in boiling carbon tetrachloride (76° C.).
5. Stability in boiling monochlorbenzene (130° C.).

In the hydrolytic test about 0.2 gram of the chloramide was refluxed with 100 cc. of water, and in the chlorinated hydrocarbon test the same amount was refluxed with 50 cc. of the hydrocarbon. Analysis at the beginning and end of each test gave the percent loss of active chlorine. This percentage is shown in the following table:

| Compound | Thermal Test | | | Liquids | | |
|---|---|---|---|---|---|---|
| | 100° C. | | 150° C., 3 hrs. | Water, 5 hrs. | Carbon tetrachloride, 5 hrs. | Monochlorobenzene, 1 hr. |
| | 100 hrs. | 200 hrs. | | | | |
| | Percent | Percent | Percent | Percent | Percent | Percent |
| Example 1 | 0 | 0 | 0 | 4 | 0 | 53 |
| Example 2 | | | 6 | 6 | | |
| Example 3 | 0 | 0 | 3 | 20 | 6 | 26 |

All of these compounds showed high thermal stability and good stability in water, thus making them very useful as impregnating agents for clothing. Due to the high active chlorine content they are extremely reactive with vesicant vapors, much more so than known chloramides.

The incorporation of these compounds in dusting powders is satisfactory because the powders do not plug the pores and provide good protection. For this purpose talc is mose suitable, with some substance added to keep the powder free flowing (e. g. various phosphate salts).

In order to obtain the glycoluril from the reaction of urea and the diketo compound, in preference to the hydantoin, it is necessary to maintain the reaction mixture acid. Hydrochloric acid is the most practical in maintaining the acid reaction conditions because it does not enter side reactions and is easily removed during chlorination. However, other acids and acid-reacting substances may be used.

For large scale production the glycoluril base is most easily chlorinated by the method given in Example 1. In this method it is highly desirable (but not essential) to add a small amount of a wetting agent or surface tension depressant to the aqueous slurry of the glycoluril in order to facilitate the dispersion of the chlorine gas which is passed into the slurry. Although the wetting agent shown in Example 1 is a sulfosuccinic acid ester, other wetting agents, such as the alkali metal sulfate esters of higher alcohols, may be employed with equal success. Even soap is useful where better wetting agents are not available.

The term "anti-vesicant," as used throughout the specification and claims, refers to substances or compositions capable of rendering harmless or neutralizing vesicant materials, particularly mustard gas.

Other variations will be apparent to those skilled in the art, and the invention should not be limited other than as defined in the appended claims.

The invention described herein may be manufactured and used by or for the Government of the United States of America for governmental purposes without the payment of any royalties thereon or therefor.

I claim:
1. A method of chlorinating glycolurils substituted in the 7 and 8 positions by a member of the group consisting of alkyl and aryl groups which comprises reacting chlorine gas with the glycoluril in an aqueous slurry containing a wetting agent and the salt of a strong base and a weak acid.
2. A method of chlorinating as defined in claim 1, wherein the wetting agent is a dialkyl ester of sodium sulfosuccinic acid.
3. A method of chlorinating as defined in claim 1, wherein the wetting agent is the di-n-octyl ester of sodium sulfosuccinic acid.
4. A method of chlorinating as defined in claim 1, wherein the salt of a strong base and a weak acid is sodium acetate.
5. A method of chlorinating 7,8-dimethyl glycoluril which comprises reacting chlorine gas with the glycoluril in an aqueous slurry containing a dialkyl ester of sodium sulfosuccinic acid as wetting agent and sodium acetate.
6. As a new compound, a 1,3,4,6-tetrachloro-7,8-dialkylglycoluril.
7. As a new compound, 1,3,4,6-tetrachloro-7,8-dimethylglycoluril.
8. A porous article of clothing impregnated with an anti-vesicant amount of a 1,3,4,6-tetrachloro-7,8-dialkylglycoluril.
9. A porous article of clothing impregnated with an anti-vesicant amount of 1,3,4,6-tetrachloro-7,8-dimethylglycoluril.

JONATHAN W. WILLIAMS.

References Cited in the file of this patent

UNITED STATES PATENTS

| Number | Name | Date |
|---|---|---|
| 1,522,561 | Weber | Jan. 13, 1925 |
| 1,771,396 | Caplan | July 29, 1930 |
| 1,878,510 | Mindeleff | Sept. 20, 1932 |
| 1,903,525 | Wood | Apr. 11, 1933 |
| 2,130,805 | Levine | Sept. 20, 1938 |
| 2,155,914 | van der Lee | Apr. 25, 1939 |
| 2,290,281 | Henze | July 21, 1942 |
| 2,311,507 | Arthur | Feb. 16, 1943 |

FOREIGN PATENTS

| Number | Country | Date |
|---|---|---|
| 588,131 | Germany | Nov. 13, 1933 |

OTHER REFERENCES

Bietz et al.: C. A., v. 4, pg. 2820–2821.
Hatt et al.: C. A., v. 30, pg. 2560–2561.